United States Patent
Lewis et al.

(10) Patent No.: US 10,737,253 B1
(45) Date of Patent: Aug. 11, 2020

(54) METALLOPHOSPHATE MOLECULAR SIEVES AND METHOD OF PREPARATION AND USE

(71) Applicant: UOP LLC, Des Plaines, IL (US)

(72) Inventors: Gregory J. Lewis, Santa Cruz, CA (US); Lisa M. Knight, Chicago, IL (US); Stephen T. Wilson, Libertyville, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 16/566,974

(22) Filed: Sep. 11, 2019

(51) Int. Cl.
| | | |
|---|---|---|
| *B01J 29/85* | (2006.01) | |
| *C10G 50/00* | (2006.01) | |
| *C10G 35/095* | (2006.01) | |
| *C01B 39/54* | (2006.01) | |
| *C01B 39/04* | (2006.01) | |

(52) U.S. Cl.
CPC ............... *B01J 29/85* (2013.01); *C01B 39/04* (2013.01); *C01B 39/54* (2013.01); *C10G 35/095* (2013.01); *C10G 50/00* (2013.01); *B01J 2229/183* (2013.01); *C01P 2002/72* (2013.01)

(58) Field of Classification Search
CPC ..... B01J 29/85; B01J 2229/183; C01B 39/54; C01B 39/04; C10G 35/095; C01P 2000/72
USPC .................................................. 423/705, 718
See application file for complete search history.

(56) References Cited

U.S. PATENT DOCUMENTS

| | | | |
|---|---|---|---|
| 4,310,440 A | 1/1982 | Wilson et al. | |
| 4,440,871 A | 4/1984 | Lok et al. | |
| 4,567,029 A | 1/1986 | Wilson et al. | |
| 4,973,785 A | 11/1990 | Lok et al. | |
| 5,194,235 A | 3/1993 | Zones | |
| 5,370,851 A | 12/1994 | Wilson | |
| 8,871,177 B2* | 10/2014 | Lewis | ..................... C01B 39/54 423/705 |
| 10,029,239 B2 | 7/2018 | Casci et al. | |
| 10,370,257 B2 | 8/2019 | Lewis | |

OTHER PUBLICATIONS

Wilson et al, Synthesis, characterization and structure of SAPO-56, a member of the ABC double-six-ring family of materials with stacking sequence AABBCCBB, Microporous and Mesoporous Materials 28 (1999) 125-137 Elsevier.

(Continued)

*Primary Examiner* — Thuan D Dang

(57) ABSTRACT

A new family of a microporous crystalline metallophosphate-based materials designated SAPO-80 has been synthesized. These metallophosphate-based materials are represented by the empirical formula

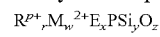

$R^{p+}{}_rM_w{}^{2+}E_xPSi_yO_z$ where R is a quaternary ammonium cation such as $\alpha,\alpha'$-bis (dimethylethylammonium)-p-xylene, E is a framework element such as aluminum or gallium and the framework may optionally contain a divalent framework metal M such as magnesium or zinc. The microporous SAPO-80 compositions are characterized by having the AFX topology and have catalytic properties for carrying out various hydrocarbon conversion processes and separating properties for separating at least one component.

5 Claims, 1 Drawing Sheet

(56) References Cited

OTHER PUBLICATIONS

Maple et al, Synthesis and Characterisation of aluminophosphate-based zeotype materials prepared with a,w-bis(N-methylpyrrolidinium)alkane cations as structure-directing agents, Royal Society of Chemistry (2007) 4175-4181, Dalton Tranactions.

Hong et al., Synthesis, Structure Solution, Characterization, and Catalytic Properties of TNU-10: A High-Silica Zeolite with the STI Topology, J. Am. Chem. Soc. 2004, 126, 5817-5826.

Park et al., Zeolite Synthesis from a Charge Density Perspective: The Charge Density Mismatch Synthesis of UZM-5 and UZM-9, Chemistry of Materials, 2014, 26, 6684-6694.

Wang et al., Hollow nanocrystals of silicoaluminophosphate molecular sieve synthesized by an aminothermal co-templating strategy, Royal Society of Chemistry, 2013.

Gramm et al., Complex zeolite structure solved by combining powder diffraction and electron microscopy, Nature, vol. 144 Nov. 2, 2006, 79-81.

Gatter, Stability of Framework Aluminum in the New Zeolite UZM-5, SSS 154 1324-1331 IZC 2004.

Seo et al., Combined Alkali-Organoammonium Structure Direction of High-Charge-Density Heteroatom-Containing Aluminophosphate Molecular Sieves, Angew. Chem. Int. Ed. 2019, 58, 9032-9037.

\* cited by examiner

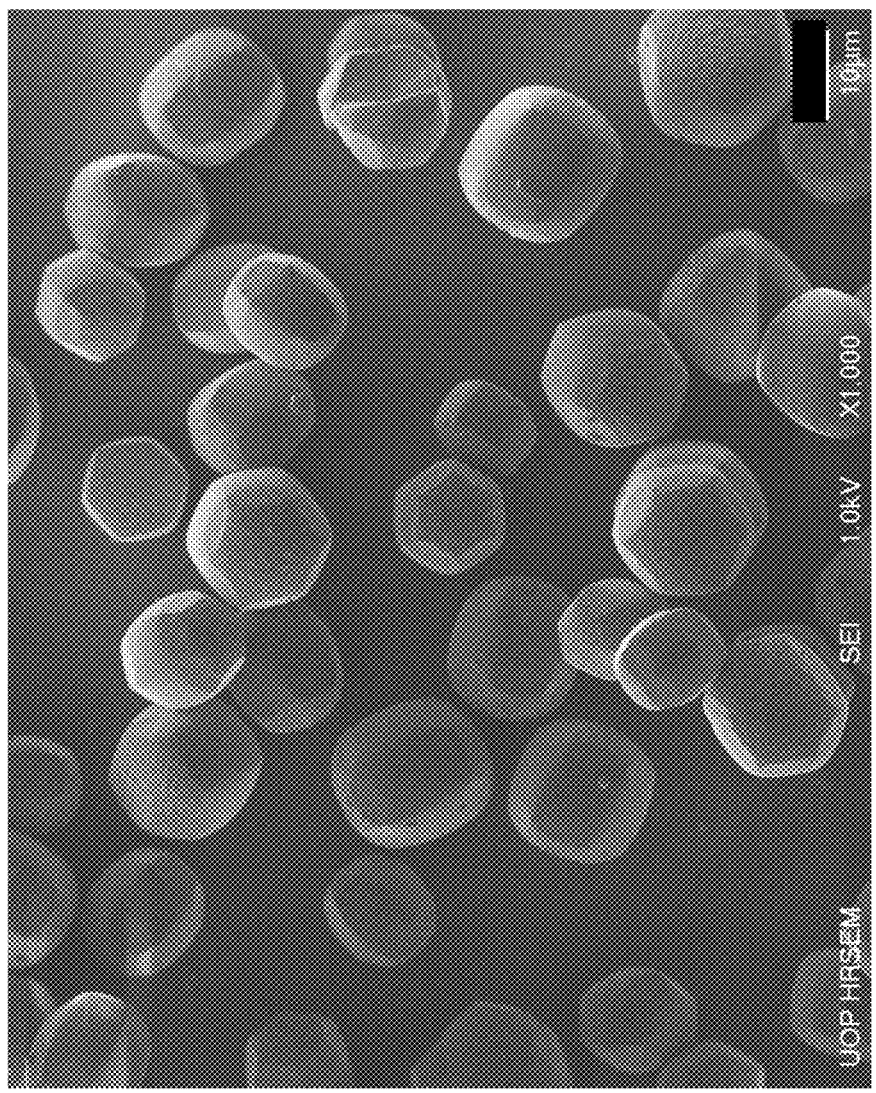

METALLOPHOSPHATE MOLECULAR SIEVES AND METHOD OF PREPARATION AND USE

FIELD

This disclosure relates to a new family of charged microporous metallophosphate molecular sieves designated SAPO-80. They are represented by the empirical formula of:

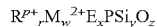

$$R^{p+}{}_r M_w^{2+} E_x P Si_y O_z$$

where M is an optional divalent framework metal such as magnesium or zinc, R is a quaternary ammonium cation such as α,α'-bis(dimethylethylammonium)-p-xylene and E is a trivalent framework element such as aluminum or gallium. The SAPO-80 molecular sieves have the AFX topology and are stable to calcination and may serve as catalysts and adsorbents.

BACKGROUND

Zeolites are crystalline aluminosilicate microporous compositions which are formed from corner sharing $AlO_{4/2}^-$ and $SiO_{4/2}$ tetrahedra. Numerous zeolites, both naturally occurring and synthetically prepared are used in a variety industrial and environmental applications. Synthetic zeolites are prepared via hydrothermal synthesis employing suitable sources of Si, Al and structure directing agents such as alkali metals, alkaline earth metals, amines, or organoammonium cations. The structure directing agents reside in the pores of the zeolite and are largely responsible for the particular structure that is ultimately formed. These species balance the framework charge associated with aluminum and can also serve as space fillers. Zeolites are characterized by having pore openings of uniform dimensions, having a significant ion exchange capacity, and being capable of reversibly desorbing an adsorbed phase which is dispersed throughout the internal voids of the crystal without significantly displacing any atoms which make up the permanent zeolite crystal structure. Zeolites can be used as catalysts for hydrocarbon conversion reactions, which can take place on the outside surfaces of the zeolite as well as on internal surfaces within the pores of the zeolite.

Over the years, new chemistry has been designed to adapt the hydrothermal synthesis techniques to produce microporous materials of other compositions, e.g., non-zeolitic compositions. In 1982, Wilson et al. first reported aluminophosphate molecular sieves, the so-called AlPOs, which are microporous materials that have many of these same properties of zeolites, although they are silica free, composed of $AlO_{4/2}^-$ and $PO_{4/2}^+$ tetrahedra (See U.S. Pat. No. 4,310,440). The AlPOs are formally neutral, they do not possess framework charge. Subsequently, charge was introduced to the neutral aluminophosphate frameworks via the substitution of $SiO_{4/2}$ tetrahedra for $PO_{4/2}^+$ tetrahedra to produce the SAPO molecular sieves (See U.S. Pat. No. 4,440,871). Another way to introduce framework charge to neutral aluminophosphates is to substitute $[M^{2+}O_{4/2}]^{2-}$ tetrahedra for $AlO_{4/2}^-$ tetrahedra, which yield the MeAPO molecular sieves (see U.S. Pat. No. 4,567,029). It is furthermore possible to introduce framework charge on AlPO-based molecular sieves via the simultaneous introduction of $SiO_{4/2}$ and $[M^{2+}O_{4/2}]^{2-}$ tetrahedra to the framework, giving MeAPSO molecular sieves (See U.S. Pat. No. 4,973,785 and U.S. Ser. No. 10/370,257). These groundbreaking patents opened new territory upon which technologists have built ever since, introducing new chemistry that has increased the diversity of compositions and structures known among the members. One such advance was the synthesis of SAPO-56, which is described in U.S. Pat. No. 5,370,851. SAPO-56 has the AFX topology (See Database of Zeolite Structures; http://www.iza-structure.org/databases/) and is prepared with the N,N,N',N'-tetramethyl-1,6-hexanediamine (TMHD) structure directing agent (SDA). A detailed study of this material found that the SAPO-56 product derived from the TMHD-based preparation contained extraframework Si, yielding a formulation of $TMHD_{3.26}(Al_{23.5}P_{19.5}Si_{4.9})O_{96}$ (See Microporous and Mesoporous Materials, 1999, 28, 125-137). The Si incorporation level into the aluminophosphate-based structure is given by $5 Si^{4+}/(23.5 Al^{3+}+19.5 P^{5+}+5 Si^{4+})=10.4\%$ Si substitution into the framework. The negative framework charge density (FWCD) in units of charge/T-atom of this SAPO-56, given $([AlO_{4/2}]^-+[PO_{4/2}]^+)/([Al]+[P]+[Si])=(-23.5+19.5)/(23.5+19.5+5)=-0.083/\text{T-atom}$.

Aluminosilicate compositions having the AFX topology have been prepared by Zones (See U.S. Pat. Nos. 4,508,837 and 5,194,235) using diquats based on two quinuclidine or two DABCO molecules linked by a 3-5 carbon chain. When another diquat based on linking two N-methylpyrrolidinium molecules via a butane moiety gave the aluminosilicates TNU-9 (See F. Gramm et al., Nature (London), 2006, 444, 79) and TNU-10 (S. B. Hong et al., J. Am. Chem. Soc., 2004, 126, 5817), Maple and Williams used similar N-methylpyrrolidinium-based SDAs with linkages varying from 3-5 carbons to successfully prepare MgAlPO compositions with the AFX topology (Dalton Trans., 2007, 4175). Their attempts to make a pure AFX topology material in a SAPO composition using the same structure directing agents (SDAs) were unsuccessful. Recently Xie et al. brought this chemistry back to aluminosilicates, employing the SDAs 1,4-bis(methylpyrrolidinium)butane, 1,6-bis(N-methylpyrrolidinium)hexane and 1,6-bis(trimethylammonium)hexane (hexamethonium) to make AFX topology aluminosilicates (See U.S. Ser. No. 10/053,368). An aminothermal approach to make SAPO AFX compositions by Wang et al. (See CrystEngComm, 2016, 18, 1000). Using high concentrations of the volatile SDAs triethylamine (TEA) and trimethylamine (TMA) along with hydrofluoric acid, a SAPO-AFX with the composition $(TEA)_{4.4}(TMA)_{2.2}(H_2O)_8[Al_{20.7}P_{16.3}Si_{11.0}O_{96}]$ was prepared. The highly volatile TEA and TMA along with dangerous HF are problematic reagents to use on large scale as is the low water levels, which hamper the homogenization required on large scale. The composition exhibits high Si incorporation $(11/(20.7+16.3+11)=22.9\%$ of framework atoms), but the FWCD=$(-20.7+16.3)/(20.7+16.3+11)$, which is $-0.092/\text{T-atom}$. More recently, Casci et al. in U.S. Pat. No. 10,029,239 also uses the TMA SDA in combination with the DABCO-based SDAs utilized in the preparation of aluminosilicate AFX compositions mentioned above (See U.S. Pat. No. 5,194,235) to make a SAPO composition with the AFX topology. No composition is disclosed, but the large size of the linked DABCO-based diquat SDAs would suggest a lower charge density than observed in the other AFX compositions disclosed above.

In contrast to the work disclosed above, applicants have synthesized high FWCD SAPO and MeAPSO (Me=$Zn^{2+}$, $Co^{2+}$, $Mn^{2+}$ and $Mg^{2+}$) compositions with the AFX topology, designated SAPO-80. The use of the more compact α,α'-bis(dimethylethylammonium)-p-xylene diquat SDA enables applicants to achieve AFX compositions with FWCD>$-0.10/\text{T-atom}$. The higher FWCD can enhance ion exchange capacity and the acid site density over that found in other SAPO-based AFX compositions. The SAPO-80 compositions are stable to SDA removal by calcination and may be used as adsorbents or catalysts.

SUMMARY

As stated, the present disclosure relates to a new family of microporous metallophosphate molecular sieves designated SAPO-80. Accordingly, one embodiment of the disclosure is a microporous crystalline material having a three-dimensional framework of at least $EO_2^-$, $PO_2^+$ and $SiO_2$ tetrahedral units and optionally $[M^{2+}O_2]^{2-}$ tetrahedral units and an empirical composition in the as synthesized and anhydrous basis expressed by an empirical formula of:

$$R^{p+}_r M^{2+}_w E_x PSi_y O_z$$

where M is at least one framework divalent metal cation selected from $Mg^{2+}$, $Zn^{2+}$, $Co^{2+}$ and $Mn^{2+}$ combinations thereof, "w" is the mole ratio of M to P and varies from 0 to 0.3, R is a quaternary ammonium cation selected from tetraethylammonium ($TEA^+$), methyltriethylammonium ($MTEA^+$), dimethyldipropylammonium ($DMDPA^+$), tetrapropylammonium ($TPA^+$), tetrabutylammonium ($TBA^+$), α,α'-bis(dimethylethylammonium)-p-xylene and combinations thereof, "r" is the mole ratio of R to P and has a value of about 0.2 to about 0.75, "p" is the average weighted valence of R and varies from 1 to 2, E is an trivalent element selected from aluminum, gallium and combinations thereof, "x" is mole ratio of E to P and varies from 0.9 to 1.6, "y" is the mole ratio of Si to P and varies from 0.15 to 1.4, the framework charge density (FWCD) resulting from $M^{2+}$ and Si insertion into the framework, given by $(-2*w-x+1)/(w+x+1+y)$, is such that FWCD>−0.10/T-atom, and "z" is the mole ratio of O to P and has a value determined by the equation:

$$z=(p\cdot r+2\cdot w+3\cdot x+5+4\cdot y)/2$$

and is characterized in that it has the x-ray diffraction pattern having at least the d-spacings and intensities set forth in Table A:

TABLE A

| 2Θ | d(Å) | I/I₀ % |
|---|---|---|
| 7.518-7.392 | 11.75-11.95 | w-m |
| 8.765-8.52 | 10.08-10.37 | m-vs |
| 11.665-11.35 | 7.58-7.79 | m-vs |
| 13.086-12.838 | 6.76-6.89 | w-m |
| 15.133-14.802 | 5.85-5.98 | w-m |
| 15.29-14.902 | 5.79-5.94 | w |
| 15.756-15.424 | 5.62-5.74 | m-s |
| 17.548-17.171 | 5.05-5.16 | m-vs |
| 17.689-17.374 | 5.01-5.1 | m-s |
| 20.027-19.624 | 4.43-4.52 | w-m |
| 20.495-20.119 | 4.33-4.41 | s-vs |
| 21.847-21.525 | 4.065-4.125 | vs |
| 22.011-21.685 | 4.035-4.095 | w-vs |
| 22.636-22.348 | 3.925-3.975 | w-m |
| 23.378-23.083 | 3.802-3.85 | m |
| 26.228-25.879 | 3.395-3.44 | m |
| 27.629-27.344 | 3.226-3.259 | m-vs |
| 28.7-28.401 | 3.108-3.14 | w |
| 29.889-29.605 | 2.987-3.015 | w |
| 30.624-30.378 | 2.917-2.94 | m-s |
| 31.624-31.305 | 2.827-2.855 | m |
| 32.019-31.704 | 2.793-2.82 | w |
| 33.408-33.077 | 2.68-2.706 | m |
| 34.854-34.508 | 2.572-2.597 | w-m |

Another embodiment of the disclosure is a calcined SAPO-80 in which the as-synthesized SAPO-80 is calcined at temperatures ranging from 400-600° C. for 2 to 24 hr resulting in a calcined SAPO-80 characterized by an x-ray diffraction pattern having at least the d-spacings and intensities set forth in Table B:

TABLE B

| 2Θ | d (Å) | I/I₀% |
|---|---|---|
| 7.622-7.492 | 11.59-11.79 | m |
| 8.943-8.696 | 9.88-10.16 | vs |
| 11.966-11.65 | 7.39-7.59 | s-vs |
| 13.224-12.99 | 6.69-6.81 | s-vs |
| 15.985-15.644 | 5.54-5.66 | w |
| 17.869-17.513 | 4.96-5.06 | m |
| 18.354-18.052 | 4.83-4.91 | m |
| 20.258-19.891 | 4.38-4.46 | w |
| 20.835-20.352 | 4.26-4.36 | m |
| 22.206-21.874 | 4.00-4.06 | m-s |
| 22.578-22.291 | 3.935-3.985 | w |
| 24.232-23.901 | 3.67-3.72 | w-m |
| 26.506-26.111 | 3.36-3.41 | m |
| 28.681-28.309 | 3.11-3.15 | m |
| 29.16-28.775 | 3.06-3.10 | w |
| 30.645-30.325 | 2.915-2.945 | m |
| 31.138-30.699 | 2.87-2.91 | m |
| 32.113-31.589 | 2.785-2.83 | w-m |
| 34.467-34.062 | 2.60-2.63 | w |
| 35.308-34.882 | 2.54-2.57 | w |

Another embodiment of the disclosure is a process for preparing the crystalline microporous metallophosphate molecular sieve described above. The process comprises forming a reaction mixture containing reactive sources of R, M, E, P and optionally Si and heating the reaction mixture at a temperature of about 60° C. to about 200° C. for a time sufficient to form the molecular sieve, the reaction mixture having a composition expressed in terms of mole ratios of the oxides of:

$$aR_{2/p}O:bMO:E_2O_3:cP_2O_5:dSiO_2:eH_2O$$

where "a" has a value of about 1.5 to 8.0, "b" has a value of about 0.0 to 0.25, "c" has a value of about 1.25 to about 4, "d" has a value of about 0.1 to about 1.5, and "e" has a value from 30 to 3000.

Yet another embodiment of the disclosure is a hydrocarbon conversion process using the above-described molecular sieve as a catalyst. The process comprises contacting at least one hydrocarbon with the molecular sieve at conversion conditions to generate at least one converted hydrocarbon.

Still another embodiment of the disclosure is a separation process using the crystalline SAPO-80 material. The process may involve separating mixtures of molecular species or removing contaminants by contacting a fluid with the SAPO-80 molecular sieve. Separation of molecular species can be based either on the molecular size (kinetic diameter) or on the degree of polarity of the molecular species. Removing contaminants may be by ion exchange with the molecular sieve.

BRIEF DESCRIPTION OF THE DRAWING

The FIGURE shows a scanning electron microscope image of the crystals of the SAPO-80 corresponding to Example 3.

DETAILED DESCRIPTION

Applicants have synthesized a new family of high framework charge density microporous SAPO and MeAPSO compositions with the AFX topology. The SAPO and MeAPSO compositions are more highly charged than the SAPO-based AFX compositions of the prior art as the FWCD is greater than −0.10/T-atom. The use of the compact and rigid SDA α,α'-bis(dimethylethylammonium)-p-xylene is largely responsible for this distinction.

The instant microporous crystalline material, designated as SAPO-80, has an empirical composition in the as-synthesized form and on an anhydrous basis expressed by the empirical formula:

$$R^{p+}_r M^{2+}_w E_x PSi_y O_z$$

where M is optional and is at least one divalent framework metal cation selected from alkaline earth and transition metals. Specific examples of the M cations include but are not limited to magnesium, cobalt (II), manganese, zinc and combinations thereof. R is a quaternary ammonium cation examples of which include but are not limited to tetraethylammonium (TEA$^+$), methyltriethylammonium (MTEA$^+$), dimethyldipropylammonium (DMDPA$^+$), tetrapropylammonium (TPA$^+$), tetrabutylammonium (TBA$^+$), α,α'-bis(dimethylethylammonium)-p-xylene and combinations thereof, and "r" is the mole ratio of R to P and varies from about 0.2 to 0.75, "p" is the average weighted valence of R and varies from 1 to 2. The value of "w" is the mole ratio of M to P and varies from 0 to 0.3. E is a trivalent element which is tetrahedrally coordinated, is present in the framework and is selected from aluminum, gallium and combinations thereof, "x" is mole ratio of E to P and varies from 0.9 to 1.6. The ratio of silicon to P is represented by "y" which varies from about 0.15 to 1.4 and the FWCD, given by (−2*v−x+1)/(w+x+1+y), is such that FWCD>−0.1/T-atom. Lastly, "z" is the mole ratio of O to P and is given by the equation:

$$z = (p \cdot r + 2 \cdot w + 3 \cdot x + 5 + 4 \cdot y)/2$$

When only one type of R quaternary ammonium cation is present, then the weighted average valence is just the valence of that cation, e.g., +1 or +2. When more than one R cation is present, the total amount of R is given by the equation:

$$R_r^{p+} = R_{r1}^{(p1)+} + R_{r2}^{(p2)+} + R_{r3}^{(p3)+} + \ldots$$

the weighted average valence "p" is given by:

$$p = \frac{r1 \cdot p1 + r2 \cdot p2 + r3 \cdot p3 + \ldots}{r1 + r2 + r3 + \ldots}$$

The framework of the SAPO-80 of this invention is composed of SiO$_{4/2}$, EO$_{4/2}^-$, PO$_{4/2}^+$ and optionally [M$^{2+}$O$_{4/2}$]$^{2-}$ tetrahedral units and the framework charge density (FWCD) units of charge per tetrahedral atom (charge/T-atom) is given by FWCD=(−2*w−x+1)/(w+x+y+1). This equation is just the sum of the charge contributions from each of the framework T-atoms divided by the total number of T-atoms. SAPO-80 differs from other SAPO-based AFX materials in the prior art in that FWCD>−0.10. In pure SAPO systems, the higher FWCD is generated by enhancing the difference between the E and P incorporation, which develops the framework charge, while keeping the overall Si incorporation low enough not to dilute the FWCD. Likewise, when optional [M$^{2+}$O$_{4/2}$]$^{2-}$ units are included in SAPO-80, these highly charged units are significant source of framework charge and again the resulting SAPO-80 exhibits FWCD>−0.10. Not to be bound by theory, but we speculate that the compact and rigid nature of the α,α'-bis (dimethylethylammonium)-p-xylene diquaternary cation enables SAPO-80 to attain the higher charge densities.

The microporous crystalline metallophosphate material, SAPO-80, is prepared by a hydrothermal crystallization of a reaction mixture prepared by combining reactive sources of R, E, phosphorous, silicon and optionally M. When E is aluminum, the sources of include but are not limited to aluminum alkoxides, precipitated aluminas, aluminum metal, aluminum hydroxide, aluminum salts and alumina sols. Specific examples of aluminum alkoxides include but are not limited to aluminum ortho sec-butoxide and aluminum ortho isopropoxide. When E is gallium sources include precipitated gallium oxyhydroxide, gallium nitrate, gallium chloride and gallium sulfate. Of course, E may be any combination of Al and Ga. Sources of phosphorus include, but are not limited to, orthophosphoric acid, phosphorus pentoxide, and ammonium dihydrogen phosphate. Sources of silica include but are not limited to tetraethylorthosilicate, colloidal silica, and precipitated silica. Sources of the optional M metals include the halide salts, nitrate salts, acetate salts, and sulfate salts of the respective alkaline earth and transition metals. R is a quaternary ammonium cation consisting of tetraethylammonium (TEA$^+$), methyltriethylammonium (MTEA$^+$), dimethyldipropylammonium (DMDPA$^+$), tetrapropylammonium (TPA$^+$), tetrabutylammonium (TBA$^+$), α,α'-bis(dimethylethylammonium)-p-xylene and combinations thereof, and the sources include the hydroxide, chloride, bromide, iodide and fluoride compounds. Specific examples include without limitation α,α'-bis(dimethylethylammonium)-p-xylene dibromide, tetrapropylammonium hydroxide, dimethyldipropylammonium hydroxide, methyltriethylammonium hydroxide and tetrabutylammonium hydroxide. In a specific embodiment, R is α,α'-bis(dimethylethylammonium)-p-xylene. In another embodiment, R is a combination of α,α'-bis(dimethylethylammonium)-p-xylene and tetrapropylammonium. In another embodiment, R is a combination of α,α'-bis(dimethylethylammonium)-p-xylene and tetrabutylammonium. In another embodiment R is a combination of α,α'-bis(dimethylethylammonium)-p-xylene and at least one quaternary ammonium cation selected from TPA$^+$, TEA$^+$, TBA$^+$, DMDPA$^+$ and MTEA$^+$ and combinations thereof.

The reaction mixture containing reactive sources of the desired components can be described in terms of molar ratios of the oxides by the formula:

$$aR_{2/p}O:bMO:E_2O_3:cP_2O_5:dSiO_2:eH_2O$$

where "a" has a value of about 1.50 to about 8, "b" has a value of about 0.0 to about 0.25, "c" has a value of about 1.25 to about 4, "d" has a value of about 0 to about 4, and "e" has a value from 30 to 3000. If alkoxides are used, it is preferred to include a distillation or evaporative step to remove the alcohol hydrolysis products. The reaction mixture is reacted at a temperature of about 60° C. to about 200° C. or from about 125° C. to about 175° C. for a period of about 1 day to about 3 weeks or for a time of about 2 days to about 10 days in a sealed reaction vessel under autogenous pressure. After crystallization is complete, the solid product is isolated from the heterogeneous mixture by means such as filtration or centrifugation, and then washed with deionized water and dried in air at ambient temperature up to about 100° C. SAPO-80 seeds can optionally be added to the reaction mixture to accelerate the formation of the desired microporous composition.

The SAPO-80 metallophosphate-based material, which is obtained from the above-described process, is characterized by the x-ray diffraction pattern, having at least the d-spacings and relative intensities set forth in Table A below.

TABLE A

| 2Θ | d(Å) | I/I₀% |
|---|---|---|
| 7.518-7.392 | 11.75-11.95 | w-m |
| 8.765-8.52 | 10.08-10.37 | m-vs |
| 11.665-11.35 | 7.58-7.79 | m-vs |
| 13.086-12.838 | 6.76-6.89 | w-m |
| 15.133-14.802 | 5.85-5.98 | w-m |
| 15.29-14.902 | 5.79-5.94 | w |
| 15.756-15.424 | 5.62-5.74 | m-s |
| 17.548-17.171 | 5.05-5.16 | m-vs |
| 17.689-17.374 | 5.01-5.1 | m-s |
| 20.027-19.624 | 4.43-4.52 | w-m |
| 20.495-20.119 | 4.33-4.41 | s-vs |
| 21.847-21.525 | 4.065-4.125 | vs |
| 22.011-21.685 | 4.035-4.095 | w-vs |
| 22.636-22.348 | 3.925-3.975 | w-m |
| 23.378-23.083 | 3.802-3.85 | m |
| 26.228-25.879 | 3.395-3.44 | m |
| 27.629-27.344 | 3.226-3.259 | m-vs |
| 28.7-28.401 | 3.108-3.14 | w |
| 29.889-29.605 | 2.987-3.015 | w |
| 30.624-30.378 | 2.917-2.94 | m-s |
| 31.624-31.305 | 2.827-2.855 | m |
| 32.019-31.704 | 2.793-2.82 | w |
| 33.408-33.077 | 2.68-2.706 | m |
| 34.854-34.508 | 2.572-2.597 | w-m |

A favored approach for the synthesis of SAPO-80 metallophosphates is the Charge Density Mismatch Approach, which has been applied to the synthesis of aluminosilicate zeolites (See U.S. Pat. No. 7,578,993 and Chem. Mater., 2014, 26, 6684-6694) and to high FWCD MeAPOs and SAPOs (See Angew. Chem. Int. Ed. 2019, 58 9032-9037). It is applied to the synthesis of high charge density AFX metallophosphates here. (Metallo)silicoaluminophosphate solutions are prepared with excess phosphate and hydroxide sources containing large, low charge density SDAs, such as TPAOH and TBAOH, which are then perturbed by the addition of more highly charged quaternary ammonium cations, in this case, α,α'-bis(dimethylethylammonium)-p-xylene, which induces crystallization under the synthesis conditions. This leads to rich chemistry in which there is often cooperation between multiple SDAs to form one molecular sieve structure. The method has advantages in expense and efficiency because non-commercially available quaternary ammonium cations, like α,α'-bis(dimethylethylammonium)-p-xylene, can be utilized in relatively small amounts as halide salts; they don't have to be converted to the hydroxide form for use, an additional and expensive step.

The SAPO-80 may be modified in many ways to tailor it for use in a particular application. Modifications include calcination, ion-exchange and acid extraction. Properties that are modified include porosity, adsorption, framework composition, acidity, thermal stability, etc. When SAPO-80 is calcined in air, there can be a loss of metal from the framework, such as Al, which can alter the x-ray diffraction pattern from that observed for the as-synthesized SAPO-80, see Studies in Surface Science, (2004) vol. 154, p. 1324-1331. Typical conditions for the calcination of the SAPO-80 sample include ramping the temperature from room temperature to a calcination temperature of 400 600° C., or a calcination temperature of 450-550° C. at a ramp rate of 1 to 5° C./min, or a ramp rate of 2 to 4° C./min, the temperature ramp conducted in an atmosphere consisting either of flowing nitrogen or flowing clean dry air. Once at the desired calcination temperature, if the calcination atmosphere employed during the temperature ramp is flowing clean dry air, it may remain flowing clean dry air. If the calcination atmosphere during the ramp was flowing nitrogen, it may remain flowing nitrogen at the calcination temperature or it may be immediately converted to clean dry air; or at the calcination temperature the calcination atmosphere will remain flowing nitrogen for a period of 1-10 hr or for a period of 2-4 hours before converting the calcination atmosphere to flowing clean dry air. The final step of the calcination is a dwell at the calcination temperature in clean dry air. Whether the calcination atmosphere during the initial temperature ramp was flowing nitrogen or flowing clean dry air, once at the calcination temperature and once the calcination atmosphere is clean dry air, the SAPO-80 sample will spend a period of 1-24 hr or a period of 2-6 hr under these conditions to complete the calcination process. The resulting calcined SAPO-80 is characterized by an x-ray diffraction pattern that has at least the diffraction lines and intensities set forth in Table B.

TABLE B

| 2Θ | d (Å) | I/I₀% |
|---|---|---|
| 7.622-7.492 | 11.59-11.79 | m |
| 8.943-8.696 | 9.88-10.16 | vs |
| 11.966-11.65 | 7.39-7.59 | s-vs |
| 13.224-12.99 | 6.69-6.81 | s-vs |
| 15.985-15.644 | 5.54-5.66 | w |
| 17.869-17.513 | 4.96-5.06 | m |
| 18.354-18.052 | 4.83-4.91 | m |
| 20.258-19.891 | 4.38-4.46 | w |
| 20.835-20.352 | 4.26-4.36 | m |
| 22.206-21.874 | 4.00-4.06 | m-s |
| 22.578-22.291 | 3.935-3.985 | w |
| 24.232-23.901 | 3.67-3.72 | w-m |
| 26.506-26.111 | 3.36-3.41 | m |
| 28.681-28.309 | 3.11-3.15 | m |
| 29.16-28.775 | 3.06-3.10 | w |
| 30.645-30.325 | 2.915-2.945 | m |
| 31.138-30.699 | 2.87-2.91 | m |
| 32.113-31.589 | 2.785-2.83 | w-m |
| 34.467-34.062 | 2.60-2.63 | w |
| 35.308-34.882 | 2.54-2.57 | w |

As synthesized, the SAPO-80 material contains exchangeable or charge balancing cations in its pores. When these organic cations that cannot be removed directly by ion exchange, the organic cations can be removed by heating under controlled conditions, for instance, in dry air, nitrogen, or ozone-containing atmospheres, with very specific temperature profiles. One method of removing organic cations from the pores is ammonia calcination. Calcination in air converts organic cations in the pores to protons, which can, for example, lead to some removal of Al from the framework upon exposure to water vapor which can slightly change the diffraction pattern, as documented above in Table B for air calcined SAPO-80. However, when the calcination is carried out in an ammonia atmosphere, the organic cation in the pore is replaced by $NH_4^+$ cation and the framework remains intact (See Studies in Surface Science, (2004) vol. 154, p. 1324-1331). Typical conditions for ammonia calcinations include the use of gaseous anhydrous ammonia flowing at a rate of 1.11/min while ramping the sample at 5° C./min to 500° C. and holding at that temperature for a time ranging from 5 minutes to an hour. The resulting ammonium form of SAPO-80 has essentially the diffraction pattern of Table A. Once in this form, the ammonia calcined material may be ion-exchanged with $H^+$, $NH_4^+$, alkali metals, alkaline earth metals, transition metals, rare earth metals, or any combination thereof, to achieve a wide variety of compositions with the SAPO-80 framework in superior condition.

In one embodiment of the disclosure, the SAPO-80 is thermally stable up to a temperature of at least 400° C., in another embodiment the SAPO-80 is thermally stable up to a temperature of at least 500° C. and in yet another embodiment SAPO-80 is thermally stable up to a temperature of 600° C.

The crystalline SAPO-80 materials of this disclosure can be used for separating mixtures of molecular species, removing contaminants through ion exchange and catalyzing various hydrocarbon conversion processes. Separation of molecular species can be based either on the molecular size (kinetic diameter) or on the degree of polarity of the molecular species.

The SAPO-80 compositions of this disclosure can also be used as a catalyst or catalyst support in various hydrocarbon conversion processes. Hydrocarbon conversion processes are well known in the art and include cracking, hydrocracking, alkylation of both aromatics and isoparaffin, isomerization, polymerization, reforming, hydrogenation, dehydrogenation, transalkylation, dealkylation, hydration, dehydration, hydrotreating, hydrodenitrogenation, hydrodesulfurization, methanol to olefins, methanation and syngas shift process. Specific reaction conditions and the types of feeds which can be used in these processes are set forth in U.S. Pat. Nos. 4,310,440, 4,440,871 and 5,126,308, which are incorporated by reference. Specific hydrocarbon conversion processes are those in which hydrogen is a component such as hydrotreating or hydrofining, hydrogenation, hydrocracking, hydrodenitrogenation, hydrodesulfurization, etc.

Hydrocracking conditions typically include a temperature in the range of 400° to 1200° F. (204-649° C.), or between 600° and 950° F. (316-510° C.). Reaction pressures are in the range of atmospheric to about 3,500 psig (24,132 kPa g), or between 200 and 3000 psig (1379-20,685 kPa g). Contact times usually correspond to liquid hourly space velocities (LHSV) in the range of about 0.1 $hr^{-1}$ to 15 $hr^{-1}$, or between about 0.2 and 3 $hr^{-1}$. Hydrogen circulation rates are in the range of 1,000 to 50,000 standard cubic feet (scf) per barrel of charge (178-8,888 std. $m^3/m^3$), or between 2,000 and 30,000 scf per barrel of charge (355-5,333 std. $m^3/m^3$). Suitable hydrotreating conditions are generally within the broad ranges of hydrocracking conditions set out above.

The reaction zone effluent is normally removed from the catalyst bed, subjected to partial condensation and vapor-liquid separation and then fractionated to recover the various components thereof. The hydrogen, and if desired some or all of the unconverted heavier materials, are recycled to the reactor. Alternatively, a two-stage flow may be employed with the unconverted material being passed into a second reactor. Catalysts of the subject disclosure may be used in just one stage of such a process or may be used in both reactor stages.

Catalytic cracking processes are preferably carried out with the SAPO-80 composition using feedstocks such as gas oils, heavy naphthas, deasphalted crude oil residua, etc. with gasoline being the principal desired product. Temperature conditions of 850° to 1100° F., LHSV values of 0.5 to 10 and pressure conditions of from about 0 to 50 psig are suitable.

Alkylation of aromatics usually involves reacting an aromatic (C2 to C12), especially benzene, with a monoolefin to produce a linear alkyl substituted aromatic. The process is carried out at an aromatic: olefin (e.g., benzene:olefin) ratio of between 5:1 and 30:1, a LHSV of about 0.3 to about 6 $hr^{-1}$, a temperature of about 100° to about 250° C. and pressures of about 200 to about 1000 psig. Further details on apparatus may be found in U.S. Pat. No. 4,870,222 which is incorporated by reference.

Alkylation of isoparaffins with olefins to produce alkylates suitable as motor fuel components is carried out at temperatures of −30° to 40° C., pressures from about atmospheric to about 6,894 kPa (1,000 psig) and a weight hourly space velocity (WHSV) of 0.1 to about 120. Details on paraffin alkylation may be found in U.S. Pat. Nos. 5,157,196 and 5,157,197, which are incorporated by reference.

The conversion of methanol to olefins is effected by contacting the methanol with the SAPO-80 catalyst at conversion conditions, thereby forming the desired olefins. The methanol can be in the liquid or vapor phase. Contacting the methanol with the SAPO-80 catalyst can be done in a continuous mode or a batch mode. The amount of time that the methanol is in contact with the SAPO-80 catalyst must be sufficient to convert the methanol to the desired light olefin products. When the process is carried out in a batch process, the contact time varies from about 0.001 hrs to about 1 hr and or from about 0.01 hr to about 10 hr. The longer contact times are used at lower temperatures while shorter times are used at higher temperatures. Further, when the process is carried out in a continuous mode, the Weight Hourly Space Velocity (WHSV) based on methanol can vary from about 1 $hr^{-1}$ to about 1000 $hr^{-1}$ or from about $1hr^{-1}$ to about 100 $hr^{-1}$.

Generally, the process must be carried out at elevated temperatures in order to form light olefins at a fast-enough rate. Thus, the process should be carried out at a temperature of about 300° C. to about 600° C., or from about 400° C. to about 550° C. or from about 450° C. to about 525° C. The process may be carried out over a wide range of pressure including autogenous pressure. Thus, the pressure can vary from about 0 kPa (0 psig) to about 1724 kPa (250 psig) or from about 34 kPa (5 psig) to about 345 kPa (50 psig).

Optionally, the methanol feedstock may be diluted with an inert diluent in order to more efficiently convert the methanol to olefins. Examples of the diluents which may be used are helium, argon, nitrogen, carbon monoxide, carbon dioxide, hydrogen, steam, paraffinic hydrocarbons, e. g., methane, aromatic hydrocarbons, e. g., benzene, toluene and combinations thereof. The amount of diluent used can vary considerably and is usually from about 5 to about 90 mole percent of the feedstock or from about 25 to about 75 mole percent.

The actual configuration of the reaction zone may be any well-known catalyst reaction apparatus known in the art. Thus, a single reaction zone or a number of zones arranged in series or parallel may be used. In such reaction zones the methanol feedstock is flowed through a bed containing the SAPO-80 catalyst. When multiple reaction zones are used, one or more SAPO-80 catalysts may be used in series to produce the desired product mixture. Instead of a fixed bed, a dynamic bed system, e. g., fluidized or moving, may be used. Such a dynamic system would facilitate any regeneration of the SAPO-80 catalyst that may be required. If regeneration is required, the SAPO-80 catalyst can be continuously introduced as a moving bed to a regeneration zone where it can be regenerated by means such as oxidation in an oxygen containing atmosphere to remove carbonaceous materials.

The following examples are presented in illustration of this disclosure and are not intended as undue limitations on the generally broad scope of the disclosure as set out in the appended claims. The products will be designated with names that contain the suffix "−80" to indicate the "−80"

structure and prefix that reflects the compositional nature of the product, such as "SAPO" for a silicoaluminophosphate and "ZnAPSO" for a zincosilicoaluminophosphate, etc.

The structure of the SAPO-80 compositions of this disclosure was determined by x-ray analysis. The x-ray patterns presented in the following examples were obtained using standard x-ray powder diffraction techniques. The radiation source was a high-intensity, x-ray tube operated at 45 kV and 35 mA. The diffraction pattern from the copper K-alpha radiation was obtained by appropriate computer-based techniques. Flat compressed powder samples were continuously scanned at 2° to 56° (2θ). Interplanar spacings (d) in Angstrom units were obtained from the position of the diffraction peaks expressed as θ where θ is the Bragg angle as observed from digitized data. Intensities were determined from the integrated area of diffraction peaks after subtracting background, "$I_o$" being the intensity of the strongest line or peak, and "I" being the intensity of each of the other peaks.

As will be understood by those skilled in the art the determination of the parameter 2θ is subject to both human and mechanical error, which in combination can impose an uncertainty of about ±0.4° on each reported value of 2θ. This uncertainty is, of course, also manifested in the reported values of the d-spacings, which are calculated from the 2θ values. This imprecision is general throughout the art and is not sufficient to preclude the differentiation of the present crystalline materials from each other and from the compositions of the prior art. In some of the x-ray patterns reported, the relative intensities of the d-spacings are indicated by the notations vs, s, m, and w which represent very strong, strong, medium, and weak, respectively. In terms of 100× $I/I_o$, the above designations are defined as: w=greater than 0 to 15; m=greater than 15 to 60: s=greater than 60 to 80 and vs=greater than 80 to 100.

In certain instances, the purity of a synthesized product may be assessed with reference to its x-ray powder diffraction pattern. Thus, for example, if a sample is stated to be pure, it is intended only that the x-ray pattern of the sample is free of lines attributable to crystalline impurities, not that there are no amorphous materials present.

In order to more fully illustrate the disclosure, the following examples are set forth. It is to be understood that the examples are only by way of illustration and are not intended as an undue limitation on the broad scope of the disclosure as set forth in the appended claims.

Example 1

Synthesis of SDA 1

α,α'-bis(dimethylethylammonium)-p-xylene dibromide

A 101.19 g portion of α,α'dibromo-p-xylene (Sigma-Aldrich) was placed in a 2-liter beaker and dissolved in 1400 ml dry tetrahydrofuran (THF) using a stirbar. The resulting solution was transferred to a 2 liter 3-neck round bottom flask equipped with an overhead stirrer, a heating mantle and a reflux condenser. Separately, 58.30 g dimethylethylamine (Sigma-Aldrich) was diluted with 42.00 g THF and placed in a pressure-equalizing dropping funnel that was attached to one of the necks of the round bottom flask. The amine solution was then added dropwise to the dibromide solution in the flask with stirring. Solid formation was observed during the addition, the reaction mixture becoming rather thick. Upon completion of the addition, the dropping funnel was charged with 100 ml THF added to rinse out residual amine and thin out reaction mixture. A thermocouple was inserted, and the reaction mixture was stirred for one hour before raising reaction temperature to 30° C. for two hours and finally stirring at 33° C. for 16 hr overnight. The reaction mixture was allowed to cool, and the solid product was isolated by filtration under a nitrogen blanket. The solid was washed out of the flask with THF and then washed with diethyl ether again with filtration conducted under a nitrogen blanket before residual solvent was removed using a vacuum oven. The identity of cyclic diquat SDA 1, α,α'-bis(dimethylethylammonium)-p-xylene dibromide, was confirmed by $^{13}C$ nmr as there was excellent agreement between observed and calculated nmr line positions.

Example 2

A silicoaluminophosphate stock solution was first prepared. A Teflon bottle was charged with 1000 g tetrabutylammonium hydroxide, TBAOH (55%, aqueous), diluted with 300.00 g deionized water before 56.32 g TEOS (98%) was added and the bottle sealed and stirred overnight. The contents of the bottle were transferred to a Teflon beaker placed under a high speed mechanical stirrer. Then 108.32 g pre-ground aluminum isopropoxide (13.2% Al) was added and stirred to dissolve. The reaction mixture was diluted with 300.00 g deionized water. Separately, 181.79 g $H_3PO_4$ (85.7%) was diluted with 200.00 g deionized water. This solution was added to the reaction mixture with stirring, resulting in a clear solution. The reaction mixture was diluted further with 182.6 g deionized water and allowed to stir to evaporate alcohols formed on hydrolysis. The amount of solution isolated was 2259.72 g, which was stored in a sealed Teflon bottle. The solution contained 0.33% Si, 0.63% Al and 2.18% P.

A 180.00 g portion of the above solution was placed in a Teflon beaker under a high-speed mechanical stirrer. Separately, 12.99 g SDA 1 from example 1 was dissolved in 40.00 g deionized water. This solution was added fast dropwise, resulting in a clear solution. The reaction mixture was allowed to stir slowly transforming to a slightly turbid suspension. The reaction mixture was distributed among 7 Teflon-lined Parr reactors and digested quiescently at autogenous pressure at various temperatures and time periods. The solid products were isolated and washed with deionized water via centrifugation and dried at room temperature. The products isolated from the 150° C./378 hr reaction (Example 2A) and the 175° C./164 hr reaction (Example 2B) were shown by powder x-ray diffraction to be SAPO-80 with the AFX topology. Representative x-ray diffraction lines for each product are shown in Table 1 below. Elemental analysis showed the sample isolated in Example 2A to have the stoichiometry $N_{0.55}Al_{1.46}PSi_{1.29}$, which corresponds to a FWCD=(-1.46+1)/(1.46+1+1.29)=-0.123/T-atom.

TABLE 1

| Example 2 A | | | Example 2 B | | |
|---|---|---|---|---|---|
| 2-Θ | d(Å) | $I/I_o$% | 2-Θ | d(Å) | $I/I_o$% |
| 7.48 | 11.80 | w | 7.48 | 11.80 | w |
| 8.68 | 10.18 | m | 8.68 | 10.18 | m |
| 11.53 | 7.67 | s | 11.53 | 7.67 | m |
| 12.96 | 6.83 | w | 12.98 | 6.82 | m |
| 14.99 | 5.91 | w | 14.99 | 5.90 | w |
| 15.16 | 5.84 | w | 15.16 | 5.84 | w |
| 15.60 | 5.68 | m | 15.62 | 5.67 | m |
| 17.38 | 5.10 | s | 17.38 | 5.10 | vs |

TABLE 1-continued

| Example 2 A | | | Example 2 B | | |
|---|---|---|---|---|---|
| 2-Θ | d(Å) | $I/I_0$% | 2-Θ | d(Å) | $I/I_0$% |
| 17.58 | 5.04 | m | 17.58 | 5.04 | m |
| 19.84 | 4.47 | m | 19.86 | 4.47 | m |
| 20.34 | 4.36 | vs | 20.34 | 4.36 | vs |
| 21.74 | 4.09 | vs | 21.74 | 4.08 | vs |
| 21.89 | 4.06 | m | 21.90 | 4.06 | m |
| 22.54 | 3.94 | w | 22.56 | 3.94 | w |
| 23.28 | 3.82 | m | 23.28 | 3.82 | m |
| 26.08 | 3.41 | m | 26.10 | 3.41 | m |
| 27.56 | 3.23 | vs | 27.56 | 3.23 | vs |
| 28.59 | 3.12 | w | 28.61 | 3.12 | w |
| 29.80 | 3.00 | w | 29.81 | 2.99 | w |
| 30.54 | 2.92 | m | 30.22 | 2.95 | w |
| 31.52 | 2.84 | m | 30.56 | 2.92 | m |
| 31.93 | 2.80 | w | 31.54 | 2.83 | m |
| 33.32 | 2.69 | m | 31.94 | 2.80 | w |
| 34.72 | 2.58 | w | 33.32 | 2.69 | m |
| | | | 34.76 | 2.58 | w |

Example 3

A Teflon bottle was charged with 120.00 g TPAOH (40%) and 3.45 g TEOS (98%), sealed and stirred overnight. The bottle was transferred to a 95° C. oven for 3 hr to hydrolyze the TEOS. The contents of the bottle were transferred directly from the oven to a Teflon beaker equipped with a high-speed stirrer. Pre-ground aluminum isopropoxide (13.2% Al), 16.09 g, was added immediately to the hot solution in a single pour and stirred until dissolved. This was followed by the fast dropwise addition of 21.52 g $H_3PO_4$ (86.0%), after which the reaction mixture was allowed to stir and cool. Separately, 6.46 g SDA1 from example 1 was dissolved in 35.00 g deionized water. This solution was added fast dropwise with vigorous stirring, yielding a clear solution. The reaction mixture was transferred to 7 Teflon-lined Parr reactors, the portions digested quiescently at a variety of temperatures and time periods. The products were isolated by centrifugation, washed with deionized water and dried at room temperature. Powder X-ray diffraction showed that product resulting from the 175° C./96 hr digestions yielded pure SAPO-80 with the AFX topology. Representative x-ray diffraction lines are shown below in Table 2 for this 175° C. product. Elemental analysis by LECO CHN and ICP on this same sample yielded the stoichiometry $N_{0.33}Al_{1.27}PSi_{0.34}$, which corresponds to FWCD=(−1.27+1)/(1.27+1+0.34)=−0.103/T-atom. Scanning electron microscopy showed 5-15μ multi-faceted spheroidal crystals. The crystals of this SAPO-80 sample were analyzed by scanning electron microscopy and are shown in the scanning electron microscope (SEM) image of FIG. 1.

TABLE 2

| 2-Θ | d(Å) | $I/I_0$% |
|---|---|---|
| 7.46 | 11.84 | w |
| 8.66 | 10.21 | m |
| 11.52 | 7.68 | m |
| 12.95 | 6.83 | m |
| 14.97 | 5.91 | w |
| 15.13 | 5.85 | w |
| 15.58 | 5.68 | m |
| 17.36 | 5.11 | m |
| 17.56 | 5.05 | m |
| 19.82 | 4.48 | m |
| 20.30 | 4.37 | vs |
| 21.70 | 4.09 | vs |
| 21.88 | 4.06 | m |
| 22.50 | 3.95 | m |
| 23.26 | 3.82 | m |
| 26.06 | 3.43 | m |
| 27.54 | 3.24 | m |
| 28.56 | 3.12 | w |
| 29.79 | 3.00 | w |
| 30.18 | 2.96 | m |
| 30.50 | 2.93 | m |
| 31.48 | 2.84 | m |
| 31.93 | 2.80 | w |
| 33.30 | 2.69 | m |
| 34.16 | 2.62 | w |
| 34.70 | 2.58 | w |

Example 4

A Teflon bottle was charged with 125.00 g TPAOH (40%) and 2.90 g TEOS (98%), sealed and stirred overnight. The bottle was transferred to a 95° C. oven for 3 hr to hydrolyze the TEOS. The contents of the bottle were transferred directly from the oven to a Teflon beaker equipped with a high-speed stirrer. Pre-ground aluminum isopropoxide (13.2% Al), 13.96 g, was added immediately to the hot solution in a single pour and stirred until dissolved. This was followed by the fast dropwise addition of 18.68 g $H_3PO_4$ (86.0%), after which the reaction mixture was allowed to stir and cool. Separately, 0.60 g $Zn(OAc)_2*2H_2O$ was dissolved in 10.00 g deionized water. This solution was added to the reaction mixture fast dropwise, yielding a clear solution. Separately, 5.61 g SDA1 from example 1 was dissolved in 25.00 g deionized water. This solution was added fast dropwise with vigorous stirring, resulting in a clear solution. The reaction mixture was transferred to 7 Teflon-lined Parr reactors, the portions digested quiescently at a variety of temperatures and time periods. The products were isolated by centrifugation, washed with deionized water and dried at room temperature. Powder X-ray diffraction showed that product resulting from the 175° C./96 hr digestions yielded pure SAPO-80 with the AFX topology. Representative x-ray diffraction lines are shown below in Table 3 for this 175° C. product. Elemental analysis by LECO CHN and ICP on this same sample yielded the stoichiometry $N_{0.29}Zn_{0.15}Al_{1.02}PSi_{0.21}$, corresponding to FWCD=(−2*0.15−1.02+1)/(0.15+1.02+1+0.21)=−0.125/T-atom. Scanning electron microscopy showed 2-10μ multi-faceted spheroidal crystals.

TABLE 3

| 2-Θ | d(Å) | $I/I_0$% |
|---|---|---|
| 7.42 | 11.90 | m |
| 8.60 | 10.27 | m |
| 11.46 | 7.72 | m |
| 12.90 | 6.86 | m |
| 14.90 | 5.94 | w |
| 15.05 | 5.88 | w |
| 15.52 | 5.70 | m |
| 17.29 | 5.12 | s |
| 17.46 | 5.08 | m |
| 19.76 | 4.49 | m |
| 20.24 | 4.38 | vs |
| 21.62 | 4.11 | vs |
| 21.78 | 4.08 | vs |
| 22.44 | 3.96 | w |
| 23.16 | 3.84 | m |

TABLE 3-continued

| 2-Θ | d(Å) | I/I₀% |
|---|---|---|
| 25.96 | 3.43 | m |
| 26.52 | 3.36 | w |
| 27.42 | 3.25 | s |
| 28.48 | 3.13 | w |
| 29.67 | 3.01 | w |
| 30.08 | 2.97 | m |
| 30.42 | 2.94 | m |
| 31.38 | 2.85 | m |
| 31.78 | 2.81 | w |
| 33.16 | 2.70 | m |
| 34.06 | 2.63 | w |
| 34.60 | 2.59 | m |

Example 5

A Teflon bottle was charged with 160.00 g TPAOH (40%) and 3.72 g TEOS (98%), sealed and stirred overnight. The bottle was transferred to a 95° C. oven for 4 hr to completely hydrolyze the TEOS. The contents of the bottle were transferred directly from the oven to a Teflon beaker equipped with a high-speed stirrer. Pre-ground aluminum isopropoxide (13.2% Al), 17.87 g, was added immediately to the hot solution in a single pour and stirred until dissolved. This was followed by the fast dropwise addition of 23.91 g H$_3$PO$_4$ (86.0%), after which the clear solution reaction mixture was allowed to stir and cool. Separately, 7.17 g SDA1 from example 1 was dissolved in 25.00 g deionized water. This solution was added fast dropwise with vigorous stirring, yielding a clear solution. Separately, 0.51 g NaCl was dissolved in 5.00 g deionized water. This solution was added dropwise to the reaction mixture, yielding a clear solution. After stirring for 1.5 hr, the reaction mixture becomes slightly hazy. The reaction mixture was transferred to 7 Teflon-lined Parr reactors, the portions digested quiescently at a variety of temperatures and time periods. The products were isolated by centrifugation, washed with deionized water and dried at room temperature. Powder X-ray diffraction showed that product resulting from the 175° C./65 hr digestion yielded pure SAPO-80 with the AFX topology. Representative x-ray diffraction lines are shown below in Table 4 for this 175° C. product. Elemental analysis by LECO CHN and ICP on this same sample yielded the stoichiometry Na$_{0.05}$N$_{0.30}$Al$_{1.27}$PSi$_{0.34}$, corresponding to FWCD=(−1.27+1)/(1.27+1+0.34)=−0.103/T-atom. Scanning electron microscopy showed roughened 3-15μ multi-faceted spheroidal crystals.

TABLE 4

| 2-Θ | d(Å) | I/I₀% |
|---|---|---|
| 7.44 | 11.87 | m |
| 8.64 | 10.23 | m |
| 11.50 | 7.69 | m |
| 12.92 | 6.85 | m |
| 14.92 | 5.93 | w |
| 15.1 | 5.85 | w |
| 15.56 | 5.69 | m |
| 17.34 | 5.11 | s |
| 17.56 | 5.05 | m |
| 19.80 | 4.48 | m |
| 20.28 | 4.38 | vs |
| 21.68 | 4.10 | vs |
| 21.87 | 4.06 | m |
| 22.48 | 3.95 | m |
| 23.26 | 3.82 | m |
| 26.02 | 3.42 | m |
| 27.54 | 3.24 | m |
| 28.54 | 3.13 | w |
| 29.78 | 3.00 | w |
| 30.12 | 2.96 | m |
| 30.46 | 2.93 | m |
| 31.44 | 2.84 | m |
| 31.92 | 2.80 | w |
| 33.29 | 2.69 | m |
| 34.12 | 2.63 | w |
| 34.66 | 2.59 | w |

Example 6

A Teflon bottle was charged with 341.03 g of TBAOH (55%), which was diluted with 279.5 g of deionized water followed by the addition of 19.21 g of TEOS (98%) with stirring. The contents of the Teflon bottle were mixed for 10 minutes. The Teflon bottle was then sealed and transferred to a 100° C. oven for 1 hour. The contents of the bottle were transferred to a Teflon beaker equipped with a high-speed stirrer. While the reaction mixture was still warm, 37.67 g of ground Al isopropoxide (13.2% Al) was added. The reaction mixture was mixed with the overhead stirrer until a clear solution was obtained. Then 62.56 g of H$_3$PO$_4$ (85%) was then slowly added while mixing. Separately, 51.77 g of SDA1 from example 1 was dissolved in 208.25 g deionized water. The SDA solution was then added while mixing with an overhead stirrer. The resultant reaction mixture was a clear solution. The reaction mixture was transferred to a 2 L autoclave and digested for 7 days at 175° C. quiescently at autogenous pressure. The solid was collected and washed with deionized water by centrifugation. The washed solid was then dried overnight at 100° C. The sample, Example 6A, was identified as pure SAPO-80 with the AFX topology by powder x-ray diffraction. Representative x-ray diffraction lines are shown below in Table 5 for this 175° C. product. Analysis of the sample by ICP and LECO CHN yielded the stoichiometry N$_{0.37}$Al$_{1.34}$PSi$_{0.50}$, corresponding to FWCD=(−1.34+1)/(1.34+1+0.50)=−0.120/T-atom. A portion of the sample was calcined in air at 500° C. The sample was ramped at 2° C./min to 500° C. in and held there for 4 hr. Representative diffraction lines for the calcined SAPO-80, Example 6B, are shown below in Table 5. A nitrogen BET surface area measurement showed the calcined SAPO-80 to have a surface area of 563 m$^2$/g, micropore volume of 0.285 cm$^3$/g and total pore volume of 0.307 cm$^3$/g.

TABLE 5

| Example 6A | | | Example 6B | | |
|---|---|---|---|---|---|
| 2-Θ | d(Å) | I/I₀% | 2-Θ | d(Å) | I/I₀% |
| 7.44 | 11.87 | m | 7.56 | 11.69 | m |
| 8.63 | 10.23 | vs | 8.81 | 10.03 | vs |
| 11.50 | 7.69 | s | 11.80 | 7.49 | s |
| 12.93 | 6.84 | m | 13.09 | 6.76 | s |
| 14.94 | 5.92 | w | 15.80 | 5.60 | w |
| 15.12 | 5.85 | w | 17.66 | 5.02 | m |
| 15.58 | 5.68 | m | 18.17 | 4.88 | m |
| 17.34 | 5.11 | m | 20.04 | 4.43 | w |
| 17.54 | 5.05 | m | 20.58 | 4.31 | m |
| 19.81 | 4.48 | w | 22.03 | 4.03 | m |
| 20.30 | 4.37 | s | 22.43 | 3.96 | w |
| 21.69 | 4.09 | vs | 24.07 | 3.70 | m |
| 21.86 | 4.06 | m | 26.34 | 3.38 | m |
| 22.50 | 3.95 | m | 28.49 | 3.13 | m |

TABLE 5-continued

| Example 6A | | | Example 6B | | |
|---|---|---|---|---|---|
| 2-Θ | d(Å) | I/I$_0$% | 2-Θ | d(Å) | I/I$_0$% |
| 23.25 | 3.82 | m | 28.93 | 3.08 | w |
| 26.04 | 3.42 | m | 30.48 | 2.93 | m |
| 27.53 | 3.24 | s | 30.87 | 2.89 | m |
| 28.56 | 3.12 | w | 31.85 | 2.81 | m |
| 29.77 | 3.00 | w | 34.2 | 2.62 | w |
| 30.16 | 2.96 | w | 35.05 | 2.56 | w |
| 30.50 | 2.93 | m | | | |
| 31.47 | 2.84 | m | | | |
| 31.91 | 2.80 | w | | | |
| 33.28 | 2.69 | m | | | |
| 34.16 | 2.62 | w | | | |
| 34.68 | 2.58 | w | | | |

Embodiments

A first embodiment is a microporous crystalline metallophosphate-based material having a three-dimensional framework of at least EO$_{4/2}^-$, [SiO$_{4/2}$], PO$_{4/2}^+$ and optionally [MO$_{4/2}$]$^{2-}$ tetrahedral units and an empirical composition in the as synthesized and anhydrous basis expressed by an empirical formula of:

$$R^{p+}{}_r M^{2+}_w E_x PSi_y O_z$$

where optional M is at least one framework divalent metal cation selected from Mg$^{2+}$, Zn$^{2+}$, Co$^{2+}$, Mn$^{2+}$ and combinations thereof, "w" is the mole ratio of M to P and varies from 0.0 to about 0.3, R is a quaternary ammonium cation selected from α,α'-bis(dimethylethylammonium)-p-xylene, tetraethylammonium (TEA$^+$), methyltriethylammonium (MTEA$^+$), dimethyldipropylammonium (DMDPA$^+$), tetrapropylammonium (TPA$^+$), tetrabutylammonium (TBA$^+$), and combinations thereof, "r" is the mole ratio of R to P and has a value of about 0.2 to about 0.75, "p" is the average weighted valence of R and varies from 1 to 2, E is an trivalent element selected from aluminum, gallium and combinations thereof, "x" is mole ratio of E to P and varies from 0.9 to 1.6, "y" is the mole ratio of Si to P and varies from 0.1 to 1.4, the framework charge density (FWCD) resulting from M$^{2+}$ and Si insertion into the framework, given by (−2*w−x+1)/(w+x+1+y), is such that FWCD>−0.10/T-atom and "z" is the mole ratio of O to P and has a value determined by the equation:

$$z=(p\cdot r+2\cdot w+3\cdot x+5+4\cdot y)/2$$

and is characterized in that it has the x-ray diffraction pattern having at least the d-spacings and relative intensities set forth in Table A:

TABLE A

| 2Θ | d(Å) | I/I$_0$% |
|---|---|---|
| 7.518-7.392 | 11.75-11.95 | w-m |
| 8.765-8.52 | 10.08-10.37 | m-vs |
| 11.665-11.35 | 7.58-7.79 | m-vs |
| 13.086-12.838 | 6.76-6.89 | w-m |
| 15.133-14.802 | 5.85-5.98 | w-m |
| 15.29-14.902 | 5.79-5.94 | w |
| 15.756-15.424 | 5.62-5.74 | m-s |
| 17.548-17.171 | 5.05-5.16 | m-vs |
| 17.689-17.374 | 5.01-5.1 | m-s |
| 20.027-19.624 | 4.43-4.52 | w-m |
| 20.495-20.119 | 4.33-4.41 | s-vs |
| 21.847-21.525 | 4.065-4.125 | vs |
| 22.011-21.685 | 4.035-4.095 | w-vs |
| 22.636-22.348 | 3.925-3.975 | w-m |
| 23.378-23.083 | 3.802-3.85 | m |
| 26.228-25.879 | 3.395-3.44 | m |
| 27.629-27.344 | 3.226-3.259 | m-vs |
| 28.7-28.401 | 3.108-3.14 | w |
| 29.889-29.605 | 2.987-3.015 | w |
| 30.624-30.378 | 2.917-2.94 | m-s |
| 31.624-31.305 | 2.827-2.855 | m |
| 32.019-31.704 | 2.793-2.82 | w |
| 33.408-33.077 | 2.68-2.706 | m |
| 34.854-34.508 | 2.572-2.597 | w-m |

The metallophosphate-based material of the first embodiment where E is aluminum or gallium.

The metallophosphate-based material of the first embodiment where M is selected from magnesium, zinc, cobalt, manganese, and combinations thereof.

The metallophosphate-based material of the first embodiment where "w" is zero and (−2*w−x+1)/(w+x+1+y)>−0.10/T-atom, such that FWCD>−0.10/T-atom.

The metallophosphate-based material of the first embodiment where "w" is greater than zero and (−2*w−x+1)/(w+x+1+y)>−0.10/T-atom, such that FWCD>−0.10/T-atom.

The metallophosphate-based material of the first embodiment where R is α,α'-bis(dimethylethylammonium)-p-xylene.

The metallophosphate-based material of the first embodiment where R is at least two quaternary ammonium ions R1 and R2 where R1 is α,α'-bis(dimethylethylammonium)-p-xylene and R2 is selected from TPA$^+$, TBA$^+$, TEA$^+$, MTEA$^+$, DPDMA$^+$ cations and combinations thereof.

A modified form of the crystalline microporous metallophosphate of the first embodiment, comprising a three-dimensional framework of at least SiO$_{4/2}$, EO$_{4/2}^-$ and PO$_{4/2}^+$ tetrahedral units and optionally [M$^{2+}$O$_{4/2}$]$^{2-}$ tetrahedral units, the modifications including ammonia calcinations, ozone calcination, ion-exchange, acid extraction, or any combination thereof.

A modified form of the crystalline microporous metallophosphate of the first embodiment, comprising a three-dimensional framework of at least SiO$_{4/2}$, EO$_{4/2}^-$ and PO$_{4/2}^+$ tetrahedral units and optionally [M$^{2+}$O$_{4/2}$]$^{2-}$ tetrahedral units, the modification entailing calcination, where typical conditions for the calcination of the SAPO-80 sample include ramping the temperature from room temperature to a calcination temperature of 400-600° C., or a calcination temperature of 450-550° C. at a ramp rate of 1 to 5° C./min, or a ramp rate of 2 to 4° C./min, the temperature ramp conducted in an atmosphere consisting either of flowing nitrogen or flowing clean dry air. Once at the desired calcination temperature, if the calcination atmosphere employed during the temperature ramp is flowing clean dry air, it may remain flowing clean dry air. If the calcination atmosphere during the ramp was flowing nitrogen, it may remain flowing nitrogen at the calcination temperature or it may be immediately converted to clean dry air; or at the calcination temperature the calcination atmosphere will remain flowing nitrogen for a period of 1-10 hr or for a period of 2-4 hours before converting the calcination atmosphere to flowing clean dry air. The final step of the calcination is a dwell at the calcination temperature in clean dry air. Whether the calcination atmosphere during the initial temperature ramp was flowing nitrogen or flowing clean dry air, once at the calcination temperature and once the calcination atmosphere is clean dry air, the SAPO-80 sample will spend a period of 1-24 hr or a period of 2-6 hr under these conditions to complete the calcination process. The resulting calcined SAPO-80 is characterized by a diffraction pattern that has at least the diffraction lines and intensities set forth in Table B.

TABLE B

| 2Θ | d (Å) | I/I$_0$% |
|---|---|---|
| 7.622-7.492 | 11.59-11.79 | m |
| 8.943-8.696 | 9.88-10.16 | vs |
| 11.966-11.65 | 7.39-7.59 | s-vs |
| 13.224-12.99 | 6.69-6.81 | s-vs |
| 15.985-15.644 | 5.54-5.66 | w |
| 17.869-17.513 | 4.96-5.06 | m |
| 18.354-18.052 | 4.83-4.91 | m |
| 20.258-19.891 | 4.38-4.46 | w |
| 20.835-20.352 | 4.26-4.36 | m |
| 22.206-21.874 | 4.00-4.06 | m-s |
| 22.578-22.291 | 3.935-3.985 | w |
| 24.232-23.901 | 3.67-3.72 | w-m |
| 26.506-26.111 | 3.36-3.41 | m |
| 28.681-28.309 | 3.11-3.15 | m |
| 29.16-28.775 | 3.06-3.10 | w |
| 30.645-30.325 | 2.915-2.945 | m |
| 31.138-30.699 | 2.87-2.91 | m |
| 32.113-31.589 | 2.785-2.83 | w-m |
| 34.467-34.062 | 2.60-2.63 | w |
| 35.308-34.882 | 2.54-2.57 | w |

A second embodiment is a process for preparing a microporous crystalline metallophosphate-based material having a three-dimensional framework of at least $SiO_{4/2}$, $EO_{4/2}^-$ and $PO_{4/2}^+$ tetrahedral units and optionally $[M^{2+}O_{4/2}]^{2-}$ tetrahedral units and an empirical composition in the as synthesized and anhydrous basis expressed by an empirical formula of:

$$R^{p+}_r M^{2+}_w E_x PSi_y O_z$$

where M is at least one framework divalent metal cation selected from $Mg^{2+}$, $Zn^{2+}$, $Co^{2+}$, $Mn^{2+}$ and combinations thereof, "w" is the mole ratio of M to P and varies from 0 to about 0.3, R is a quaternary ammonium cation selected from tetraethylammonium ($TEA^+$), methyltriethylammonium ($MTEA^+$), dimethyldipropylammonium ($DMDPA^+$), tetrapropylammonium ($TPA^+$), tetrabutylammonium ($TBA^+$), α,α'-bis(dimethylethylammonium)-p-xylene and combinations thereof, "r" is the mole ratio of R to P and has a value of about 0.2 to about 0.75, "p" is the average weighted valence of R and varies from 1 to 2, E is an trivalent element selected from consisting of aluminum, gallium and combinations thereof, "x" is mole ratio of E to P and varies from 0.9 to 1.6, "y" is the mole ratio of Si to P and varies from 0.15 to 1.4, the framework charge density (FWCD) resulting from $M^{2+}$ and Si insertion into the framework, given by (-2*w-x+1)/(w+x+1+y)>-0.10/T-atom, i.e., FWCD>-0.10/T-atom and "z" is the mole ratio of O to P and has a value determined by the equation:

$$z=(p·r+2·w+3·x+5+4·y)/2$$

and is characterized in that it has the x-ray diffraction pattern having at least the d-spacings and intensities set forth in Table A:

TABLE A

| 2Θ | d(Å) | I/I$_0$% |
|---|---|---|
| 7.518-7.392 | 11.75-11.95 | w-m |
| 8.765-8.52 | 10.08-10.37 | m-vs |

TABLE A-continued

| 2Θ | d(Å) | I/I$_0$% |
|---|---|---|
| 11.665-11.35 | 7.58-7.79 | m-vs |
| 13.086-12.838 | 6.76-6.89 | w-m |
| 15.133-14.802 | 5.85-5.98 | w-m |
| 15.29-14.902 | 5.79-5.94 | w |
| 15.756-15.424 | 5.62-5.74 | m-s |
| 17.548-17.171 | 5.05-5.16 | m-vs |
| 17.689-17.374 | 5.01-5.1 | m-s |
| 20.027-19.624 | 4.43-4.52 | w-m |
| 20.495-20.119 | 4.33-4.41 | s-vs |
| 21.847-21.525 | 4.065-4.125 | vs |
| 22.011-21.685 | 4.035-4.095 | w-vs |
| 22.636-22.348 | 3.925-3.975 | w-m |
| 23.378-23.083 | 3.802-3.85 | m |
| 26.228-25.879 | 3.395-3.44 | m |
| 27.629-27.344 | 3.226-3.259 | m-vs |
| 28.7-28.401 | 3.108-3.14 | w |
| 29.889-29.605 | 2.987-3.015 | w |
| 30.624-30.378 | 2.917-2.94 | m-s |
| 31.624-31.305 | 2.827-2.855 | m |
| 32.019-31.704 | 2.793-2.82 | w |
| 33.408-33.077 | 2.68-2.706 | m |
| 34.854-34.508 | 2.572-2.597 | w-m | the process comprising forming a reaction mixture containing reactive sources of R, E, P, Si and optionally M and heating the reaction mixture at a temperature of about 60° C. to about 175° C., for a time sufficient to form the metallophosphate-based material, the reaction mixture having a composition expressed in terms of mole ratios of the oxides of:

$$aR_{2/p}O:bMO:E_2O_3:cP_2O_5:dSiO_2:eH_2O$$

where "a" has a value of 1.5 to 8, "b" has a value of 0.0 to 0.25, "c" has a value of 1.25 to 4, "d" has a value of 0.1 to 1.5, and "e" has a value from 30 to 3000.

The process of the second embodiment where E is aluminum or gallium.

The process of the second embodiment where M is selected from magnesium, zinc, cobalt, manganese and combinations thereof.

The process of the second embodiment where the source of M is selected from halide salts, nitrate salts, acetate salts, sulfate salts and combinations thereof.

The process of the second embodiment where the source of E is selected from aluminum isopropoxide, aluminum sec-butoxide, precipitated alumina, Al(OH)$_3$, aluminum metal, aluminum salts, precipitated gallium oxyhydroxide, gallium sulfate, gallium nitrate, and gallium chloride.

The process of the second embodiment where the silicon source is selected from tetraethylorthosilicate, fumed silica, colloidal silica and precipitated silica.

The process of the second embodiment where the reaction mixture is reacted at a temperature of about 125° C. to about 175° C. for a time of about 1 day to about 10 days.

The process of the second embodiment where R is α,α'-bis(dimethylethylammonium)-p-xylene.

The process of the second embodiment where R is at least two quaternary ammonium ions R1 and R2 where R1 is α,α'-bis(dimethylethylammonium)-p-xylene and R2 is selected from $TPA^+$, $TBA^+$, $TEA^+$, $MTEA^+$, $DPDMA^+$ cations and combinations thereof.

The process of the second embodiment further comprising adding SAPO-80 seeds to the reaction mixture.

A third embodiment is a process comprising contacting a stream with a material to generate a product;
  wherein the process is a hydrocarbon conversion process, the stream is a hydrocarbon stream, and the product is a converted product; or wherein the process is a separation process, the stream is a mixture of at least two components; and the product is at least one separated component;

wherein the material comprises a microporous crystalline SAPO-80 material, a modified microporous crystalline SAPO-80 material, or combinations thereof, wherein the SAPO-80 has a three-dimensional framework of at least $EO_{4/2}$, $PO_{4/2}{}^+$, $SiO_{4/2}$ and optionally $[MO_{4/2}]^{2-}$ tetrahedral units and an empirical composition in the as synthesized and anhydrous basis expressed by an empirical formula of:

$$R^{p+}{}_r M_w{}^{2+} E_x PSi_y O_z$$

where optional M is at least one framework divalent metal cation selected from $Mg^{2+}$, $Zn^{2+}$, $Co^{2+}$, $Mn^{2+}$ and combinations thereof, "w" is the mole ratio of M to P and varies from 0 to about 0.3, R is a quaternary ammonium cation selected from tetraethylammonium ($TEA^+$), methyltriethylammonium ($MTEA^+$), dimethyldipropylammonium ($DMDPA^+$), tetrapropylammonium ($TPA^+$), tetrabutylammonium ($TBA^+$), α,α'-bis(dimethylethylammonium)-p-xylene and combinations thereof, "r" is the mole ratio of R to P and has a value of about 0.2 to about 0.75, "p" is the average weighted valence of R and varies from 1 to 2, E is an trivalent element selected from aluminum, gallium and combinations thereof, "x" is mole ratio of E to P and varies from 0.9 to 1.6, "y" is the mole ratio of Si to P and varies from 0.15 to 1.4, the framework charge density (FWCD) resulting from $M^{2+}$ and Si insertion into the framework, given by $(-2*w\cdot x+1)/(w+x+1+y)$, is such that FWCD>−0.10/T-atom, and "z" is the mole ratio of O to P and has a value determined by the equation:

$$z=(p\cdot r+2\cdot w+3\cdot x+5+4\cdot y)/2$$

and is characterized by an x-ray diffraction pattern having at least the d-spacings and intensities set forth in Table A:

TABLE A

| 2Θ | d(Å) | I/I₀% |
|---|---|---|
| 7.518-7.392 | 11.75-11.95 | w-m |
| 8.765-8.52 | 10.08-10.37 | m-vs |
| 11.665-11.35 | 7.58-7.79 | m-vs |
| 13.086-12.838 | 6.76-6.89 | w-m |
| 15.133-14.802 | 5.85-5.98 | w-m |
| 15.29-14.902 | 5.79-5.94 | w |
| 15.756-15.424 | 5.62-5.74 | m-s |
| 17.548-17.171 | 5.05-5.16 | m-vs |
| 17.689-17.374 | 5.01-5.1 | m-s |
| 20.027-19.624 | 4.43-4.52 | w-m |
| 20.495-20.119 | 4.33-4.41 | s-vs |
| 21.847-21.525 | 4.065-4.125 | vs |
| 22.011-21.685 | 4.035-4.095 | w-vs |
| 22.636-22.348 | 3.925-3.975 | w-m |
| 23.378-23.083 | 3.802-3.85 | m |
| 26.228-25.879 | 3.395-3.44 | m |
| 27.629-27.344 | 3.226-3.259 | m-vs |
| 28.7-28.401 | 3.108-3.14 | w |
| 29.889-29.605 | 2.987-3.015 | w |
| 30.624-30.378 | 2.917-2.94 | m-s |
| 31.624-31.305 | 2.827-2.855 | m |
| 32.019-31.704 | 2.793-2.82 | w |
| 33.408-33.077 | 2.68-2.706 | m |
| 34.854-34.508 | 2.572-2.597 | w-m | wherein the modified crystalline microporous SAPO-80 comprises a three-dimensional framework of at least $SiO_{4/2}$, $EO_{4/2}{}^-$ and $PO_{4/2}{}^+$ tetrahedral units and optionally $[MO_{4/2}]^{2-}$ tetrahedral units derived from SAPO-80 by calcination, ammonia calcination, ion-exchange, steaming, acid extraction or any combination thereof, wherein when the modification process is calcination, the calcined SAPO-80 will have a diffraction pattern characterized by at least the diffraction lines and intensities given in Table B:

TABLE B

| 2Θ | d (Å) | I/I₀% |
|---|---|---|
| 7.622-7.492 | 11.59-11.79 | m |
| 8.943-8.696 | 9.88-10.16 | vs |
| 11.966-11.65 | 7.39-7.59 | s-vs |
| 13.224-12.99 | 6.69-6.81 | s-vs |
| 15.985-15.644 | 5.54-5.66 | w |
| 17.869-17.513 | 4.96-5.06 | m |
| 18.354-18.052 | 4.83-4.91 | m |
| 20.258-19.891 | 4.38-4.46 | w |
| 20.835-20.352 | 4.26-4.36 | m |
| 22.206-21.874 | 4.00-4.06 | m-s |
| 22.578-22.291 | 3.935-3.985 | w |
| 24.232-23.901 | 3.67-3.72 | w-m |
| 26.506-26.111 | 3.36-3.41 | m |
| 28.681-28.309 | 3.11-3.15 | m |
| 29.16-28.775 | 3.06-3.10 | w |
| 30.645-30.325 | 2.915-2.945 | m |
| 31.138-30.699 | 2.87-2.91 | m |
| 32.113-31.589 | 2.785-2.83 | w-m |
| 34.467-34.062 | 2.60-2.63 | w |
| 35.308-34.882 | 2.54-2.57 | w |

The process of the third embodiment where the hydrocarbon conversion process is selected from methanol to olefins, alkylation, isomerization, olefin dimerization and oligomerization and dewaxing.

The process of the third embodiment wherein the separation is based on molecular size of the components, degree of polarity of the components, or ion exchange of the components with the material.

What is claimed is:

1. A microporous crystalline metallophosphate-based material having a three-dimensional framework of at least $EO_{4/2}{}^-$, $SiO_{4/2}$, $PO_{4/2}{}^+$ and optionally $[MO_{4/2}]^{2-}$ tetrahedral units and an empirical composition in the as synthesized and anhydrous basis expressed by an empirical formula of:

$$R^{p+}{}_r M_w{}^{2+} E_x PSi_y O_z$$

where M is at least one framework divalent metal cation selected from $Mg^{2+}$, $Zn^{2+}$, $Co^{2+}$, $Mn^{2+}$ and combinations thereof, "w" is the mole ratio of M to P and varies from 0 to about 0.3, R is a quaternary ammonium cation selected from tetraethylammonium ($TEA^+$), methyltriethylammonium ($MTEA^+$), dimethyldipropylammonium ($DMDPA^+$), tetrapropylammonium ($TPA^+$), tetrabutylammonium ($TBA^+$), α,α'-bis(dimethylethylammonium)-p-xylene and combinations thereof, "r" is the mole ratio of R to P and has a value of about 0.2 to about 0.75, "p" is the average weighted valence of R and varies from 1 to 2, E is an trivalent element selected from aluminum, gallium and combinations thereof, "x" is mole ratio of E to P and varies from 0.9 to 1.6, "y" is the mole ratio of Si to P and varies from 0.15 to 1.4, the framework charge density (FWCD) resulting from $M^{2+}$ and Si insertion into the framework, given by $(-2*w-x+1)/(w+x+1+y)$, is such that FWCD>−0.10/T-atom, and "z" is the mole ratio of O to P and has a value determined by the equation:

$$z=(p\cdot r+2\cdot w+3\cdot x+5+4\cdot y)/2$$

and is characterized in that it has the x-ray diffraction pattern having at least the d-spacings and intensities set forth in Table A:

TABLE A

| 2Θ | d(Å) | I/I₀% |
|---|---|---|
| 7.518-7.392 | 11.75-11.95 | w-m |
| 8.765-8.52 | 10.08-10.37 | m-vs |
| 11.665-11.35 | 7.58-7.79 | m-vs |
| 13.086-12.838 | 6.76-6.89 | w-m |
| 15.133-14.802 | 5.85-5.98 | w-m |
| 15.29-14.902 | 5.79-5.94 | w |
| 15.756-15.424 | 5.62-5.74 | m-s |
| 17.548-17.171 | 5.05-5.16 | m-vs |
| 17.689-17.374 | 5.01-5.1 | m-s |
| 20.027-19.624 | 4.43-4.52 | w-m |
| 20.495-20.119 | 4.33-4.41 | s-vs |
| 21.847-21.525 | 4.065-4.125 | vs |
| 22.011-21.685 | 4.035-4.095 | w-vs |
| 22.636-22.348 | 3.925-3.975 | w-m |
| 23.378-23.083 | 3.802-3.85 | m |
| 26.228-25.879 | 3.395-3.44 | m |
| 27.629-27.344 | 3.226-3.259 | m-vs |
| 28.7-28.401 | 3.108-3.14 | w |
| 29.889-29.605 | 2.987-3.015 | w |
| 30.624-30.378 | 2.917-2.94 | m-s |
| 31.624-31.305 | 2.827-2.855 | m |

TABLE A-continued

| 2Θ | d(Å) | I/I₀% |
|---|---|---|
| 32.019-31.704 | 2.793-2.82 | w |
| 33.408-33.077 | 2.68-2.706 | m |
| 34.854-34.508 | 2.572-2.597 | w-m. |

2. The metallophosphate-based material of claim 1 where "w" is zero and $(-2*w-x+1)/(w+x+1+y) > -0.10/\text{T-atom}$.

3. The metallophosphate-based material of claim 1 where "w" is greater than zero and $(-2*w-x+1)/(w+x+1+y) > -0.10/\text{T-atom}$.

4. The metallophosphate-based material of claim 1 where R is α,α'-bis(dimethylethylammonium)-p-xylene.

5. The metallophosphate-based material of claim 1 where R is at least two quaternary ammonium ions R1 and R2 where R1 is α,α'-bis(dimethylethylammonium)-p-xylene and R2 is selected from $TPA^+$, $TBA^+$, $TEA^+$, $MTEA^+$, $DPDMA^+$ cations and combinations thereof.

* * * * *